April 5, 1938.                J. MIHALYI                 2,113,307
                         RANGE FINDER FOR CAMERAS
                          Filed Aug. 31, 1934              2 Sheets-Sheet 1

Inventor:
Joseph Mihalyi,
By Newton M. Perrins
   Rolla L. Carter
         Attorneys April 5, 1938.　　　　　J. MIHALYI　　　　　2,113,307
RANGE FINDER FOR CAMERAS
Filed Aug. 31, 1934　　　　　2 Sheets-Sheet 2
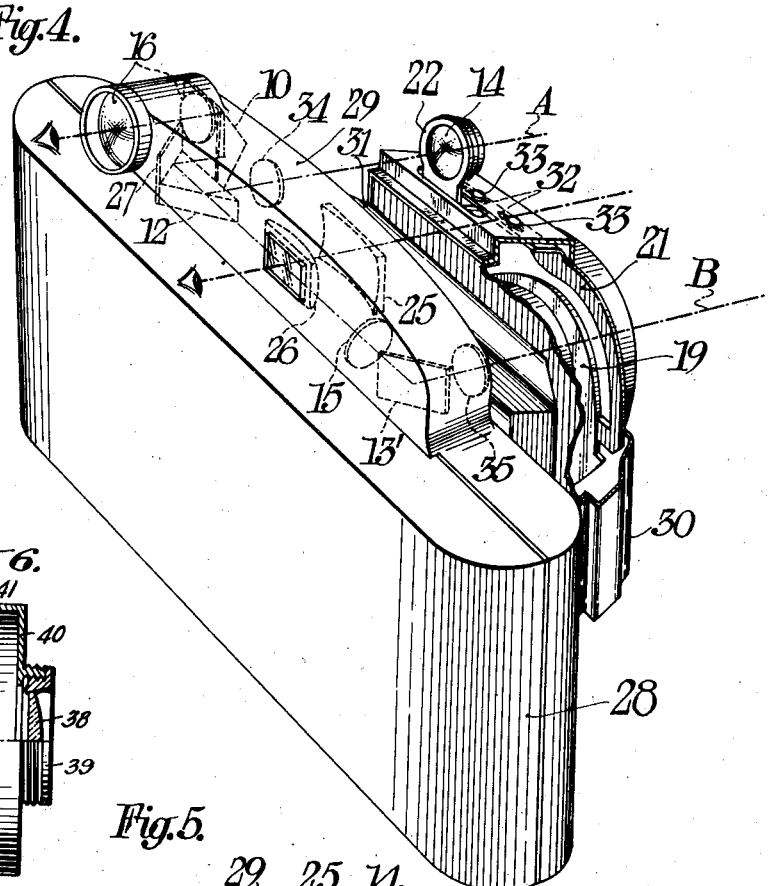
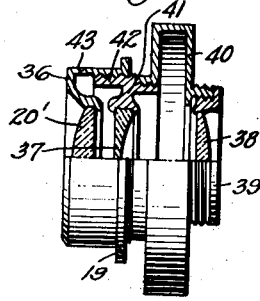
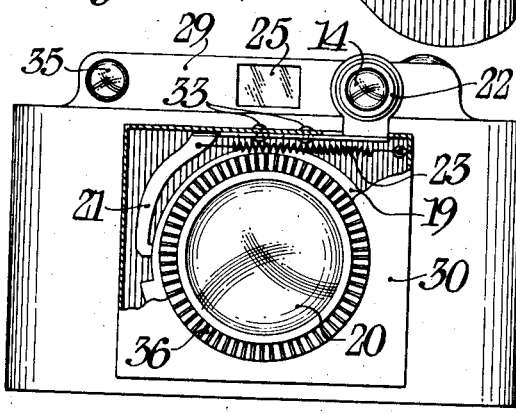
Inventor:
Joseph Mihalyi,
By Newton M. Perkins
Rolla N. Carter
Attorneys Patented Apr. 5, 1938

2,113,307

UNITED STATES PATENT OFFICE 2,113,307

RANGE FINDER FOR CAMERAS

Joseph Mihalyi, Rochester, N. Y., assignor, by mesne assignments, to Eastman Kodak Company, Jersey City, N. J., a corporation of New Jersey Application August 31, 1934, Serial No. 742,242
In Germany June 20, 1934

6 Claims. (Cl. 95—44)

My invention relates to photographic cameras provided with range finders of the general type in which, as the adjustment necessary to determine the range of the object is made, focusing of the camera is simultaneously effected. In cameras of this type it is customary to employ a range finder of the split field coincidence and short base type. The use of a split field type range finder facilitates the bringing of the two images into coincidence, but the shorter the base of the range finder, other things being equal, the greater the difficulty of determining exactly when the two images are in coincidence.

It is an object of the present invention to provide a range finder and focusing system of simple and robust construction and which, when mounted on small cameras, may be provided with a longer base line than has heretofore been possible. Another object of the invention is to provide a range finder which may be employed to advantage on small cameras of the folding type.

According to the invention, there is combined with reflecting elements mounted on the camera and fixed relatively at the ends of the range finder base, a lens or lens system movable across the path of the rays proceeding to one end only of the base of the range finder for the purpose of bringing the images into coincidence, and means for effecting on the one hand movement of the camera lens for focusing purposes, and on the other hand the said movement of the range finder lens, these movements being brought about simultaneously and in correlation. This movable lens or lens system in the range finder system is a telescope objective and may conveniently be designated a field lens, and its movement is in a direction parallel to the range finder base. A rotatable cam preferably is employed whereby the focusing movement of the camera lens is transmitted simultaneously and correspondingly to and effects this movement of the range finder field lens. The focusing of the camera may be effected by movement in the direction of its axis of the whole objective or a part or one member only of the camera objective.

In accordance with the invention, the camera is preferably provided with a view finder which may be of a well-known type and is disposed separate of and where it will not interfere with the range finder system.

The invention as well as other objects and advantages of it will be fully understood from the following description when read in connection with the accompanying drawings, and its scope will be pointed out in the appended claims.

In the accompanying drawings in which like reference characters indicate like parts throughout:

Fig. 4 is a view in perspective of a camera provided with a range finder in accordance with the invention;

Fig. 5 is a front view of the camera shown in Fig. 4 with part of the lens board torn away; and Fig. 6 is a side view partly in section of the mounting for the camera objective with its casing removed.

Figure 1:
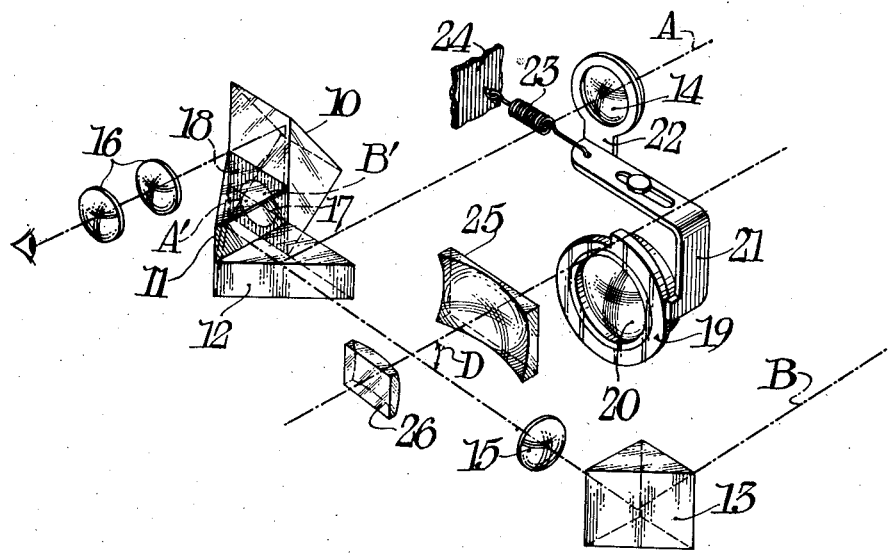
Fig. 1 is a diagrammatic view in perspective of the optical system of a range finder made in accordance with the invention.

The optical parts comprised in the range finder as shown in Fig. 1 consist of three right-angle prisms 10, 11, and 12 arranged to form a modified Porro prism erecting system adapted to receive two beams of light entering the system at 90° to each other, one of which is a direct beam and the other is a deflected beam which traverses the base line of the finder. One end of this base line is determined by the erecting prism assembly and the other is defined by a right-angle prism 13 which receives light from the object and bends it through a 90° angle and along the base line of the range finder.

The image-forming part of the range finder comprises telescopes having two objectives 14 and 15 of the same focal length and a single ocular consisting of two lens elements 16 for viewing the adjacent images formed by the objectives, as will now be described. The objective 14 positioned in the direct light beam A is of such focal length that the light passing therethrough, after being twice reflected by the prism 12, forms an inverted half image A' of the field of view on the surface between the prism 12 and the prism 10. The objective 15 positioned in the base line of the range finder receives light from the beam B after being deflected by the prism 13 and forms an inverted half image B' at the contacting faces of the prisms 11 and 10.

The two half images A' and B' are adjacent and sharply separated by the line 17 formed between the two prisms 11 and 12. The size of these images A' and B' may be defined by an opaque diaphragm 18 which serves as a field stop for the telescope systems. The focal length of the ocular 16 is such as to take in the glass path of the prism 10 to the focal plane at which the images A' and B' appear. It will be noted that the above arrangement whereby the two beams A and B enter the erecting system on the same side makes it possible to utilize almost the entire over-all width of the range finder for the base line length.

The telescope objective lens 14 is preferably utilized for bringing the range finder images into coincidence by arranging it to be moved transversely of its optical axis in strict accordance with the distance for which the camera is focused. One suitable arrangement for imparting this movement to the objective lens 14 is shown in Fig. 1 as comprising a radial cam 19 rotatable with the camera objective 20 in focusing, and which, through a cam follower 21, imparts movement in one direction to the objective 14 and its mount 22 carried by the cam follower 21. For keeping the cam follower 21 in contact with the cam 19 and for moving the objective 14 in the other transverse direction, a coiled spring 23 may be provided having one end secured to the cam follower 21 and its other end anchored to a suitable part 24 of the casing for the objective lens 20 of the camera.

The range finder construction as shown in Fig. 1 permits the use of a view finder consisting of the usual negative forward lens 25 and a rear positive lens 26 without interfering with the range finder system and without noticeably increasing the over-all size of the combined systems. As shown, the view finder consisting of the lenses 25 and 26 is positioned in the base line of the range finder, but may have its optical axis displaced vertically with respect to this base line as indicated by the double-headed arrow D.

Figure 2:
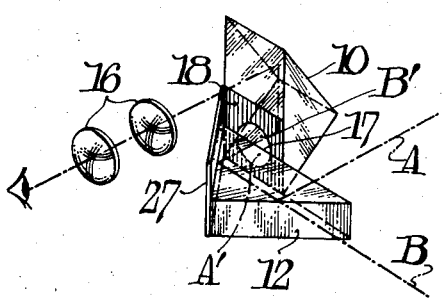
Fig. 2 is a fragmentary view in perspective showing a modified form of the image erecting system.

It will be understood that, if desired, the several prisms shown in Fig. 1 may be replaced by suitably arranged mirrors, and one convenient alternative arrangement for the erecting prism assembly is shown in Fig. 2 as utilizing a surface mirror 27 in place of the prism 11 as shown in Fig. 1.

Figure 3:
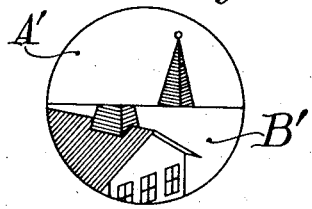
Fig. 3 shows the field of view when the split images are not in coincidence.

The telescope objectives 14 and 15 form inverted images A' and B' at the coincidence line 17, and these images, when erected and viewed through the ocular lenses 16, will appear as shown in Fig. 3, and adjustment of the camera objective 20 to bring these two images into coincidence by moving the telescope objective 14 will insure the camera being in focus for the object whose images are brought into coincidence.

The camera upon which this range finder may be mounted may be constructed in any desired manner. The invention, however, is particularly intended for use with small folding cameras. A preferred feature in the camera structure is, however, that the lens system is so formed or arranged as to permit of focusing being effected by a single member of the camera lens system, although there may be employed the more customary arrangement in which the whole lens system is movable in front of the camera casing for the purpose of adjusting the camera focus.

One complete embodiment of my invention is shown in Fig. 4 as comprising a folding camera, the body portion 28 of which is provided on its top side with a housing 29 for the various parts of the range finder and view finder. A camera lens board or casing 30 is movable to and from the camera body 28 in any suitable well-known manner and is connected thereto by a suitable light-tight bellows 31. The mount 22 for the telescope objective lens 14 is formed integrally with the cam follower 21, a flat portion of which is provided with slots 32 through which extend pins 33 carried by the upper side of the camera objective casing 30 to form a sliding connection between the cam follower 21 and the casing 30. As above described, the cam follower 21 contacts with the cam 19 which is rotatable with the focusing movement of the camera objective.

The range finder housing 29 formed on the top side of the camera body 28 is provided with windows 34 and 35 which coincide respectively with the entering beams A and B. The housing 29 is also provided intermediate its ends with suitable openings in which may be mounted the lenses 25 and 26 of the view finder. It will be noted that in Fig. 4 the light deflector for the range finder beam B consists of a plane mirror 13' which is the optical equivalent of the prism 13 shown in Fig. 1.

As is best shown in Fig. 5, which is a front view of the camera shown in Fig. 4, the cam follower 21 is resiliently held into engagement with the radial cam 19 by means of the coiled spring 23. As shown in this figure, the camera objective 20 may be focused by rotating a focusing ring 36.

In its preferred form the camera focus is varied by adjusting a single element of the camera lens system as is shown partly in section in Fig. 6. The camera lens 20 may take any suitable form and is here shown as being of the Cooke type consisting of a front element 20', a middle element 37 and a rear element 38. The rear element 38 is provided with a mounting ring 39 which is secured to the rear side of a shutter casing 40 (the shutter mechanism has been omitted) in any well known manner as by screw threads. On the front of the casing 40 is secured the middle lens element 37 by means of its mounting ring 41 which is provided with an annular threaded portion 42 adapted to receive a threaded lip 43 extending rearwardly from the focusing ring 36. It will be evident that rotation of the ring 36 will vary the spacing between the lens elements 20' and 37 to alter in a well known manner the focus of the lens system. The lip 43 may carry the cam 19 which actuates the movable element of the range finder as above described.

In using the camera provided with the range finder as described, it is pointed toward the object upon which it is desired to focus the camera and the two split images of this object are viewed through the ocular 16 of the range finder, and if they are out of coincidence, as shown in Fig. 3, the focusing ring 36 is rotated, which rotates the radial cam 19 which in turn actuates the cam follower 21 to move the beam deflecting telescope objective 14 transversely of its axis until the two images A' and B' are coincident, at which time the camera objective 20 will be focused for this object.

From the above description, it will be seen that my invention makes possible the use of a range finder and focusing mechanism particularly suitable for application to a folding camera and by mounting one of the telescope objectives on the lens board of the camera which is moved out from the camera body for use, makes it possible to increase the length of the base line of the range finder accordingly. It is, of course, possible to employ this range finder structure on a camera of the non-folding type in which the front is always fixed in relation to the back part thereof. The present invention also enables the mechanism for effecting the simultaneous focusing of the camera lens and the adjustment of the movable part of the range finder to be strongly and simply constructed and arranged in a compact manner.

It will be noted that my invention permits a construction making it possible to employ in the range finder an optical system which will give a magnification of the object, thereby further increasing the effective length of the base line.

Although I have illustrated and described a spiral cam with a suitable cam follower for translating focusing movement of the camera objective into transverse movement of the telescope objective lens for adjusting the deflection of one of the range finder images, it will be understood that other suitable arrangements may be employed so long as the desired correlation between the range finder setting and the focusing of the camera objective is maintained.

Various modifications will occur to those skilled in this art without departing from the spirit of my invention, the scope of which is pointed out in the appended claims.

What I claim as my invention and desire to secure by Letters Patent is:

1. In a focusing finder, the combination with a camera body, of a lens board movable to and from a fixed position in front of the camera body, a lens adjustable in said board for focusing, a base type range finder having its base line carried by the camera body and extending transversely of the optical axis of said lens, an image uniting and erecting system arranged at one end of the base line, a reflector and objective at the other end of the base line for forming an image in said system of a part of the field of view, a second objective carried by the lens board with its optical axis perpendicular to and intersecting the base line for forming in said system an image of a vertically adjacent part of the field of view, and a motion transmitting coupling between the adjustable lens and the second objective said coupling being so arranged that when the camera is focused on a field of view the adjacent images will be coincident.

2. In a folding camera, a lens board movable to a fixed position in front of the camera body at which the camera is operative, an adjustable lens in the board for focusing the camera, a range finder including an objective mounted on the camera body and a second objective carried by the lens board, and means coupled to the adjustable lens for moving said second objective transversely of its optical axis in accordance with the focusing adjustment of the lens.

3. In a photographic camera, a camera lens, supporting means for the camera lens, a rotatable member for focusing said lens, a cam carried by the rotatable member, a self-contained base line range finder mounted on the camera and having two telescopes consisting of two objectives and a single ocular, an image uniting and erecting prism system between said objectives and the ocular, reflectors for directing the light from the objectives into said prism system, one of said objectives being positioned in the base line of the range finder and the other of said objectives being mounted on the camera lens supporting means, and means actuated by said cam for moving said other objective transversely of its optical axis.

4. A photographic camera having a focusing lens, a lens board movable to and from the body of the camera, a mount on said board for the lens having a part adjustable for focusing the lens, a range finder system for the camera including two telescope objectives and light deflecting members cooperating to form adjacent images of adjacent parts of an object field, and an ocular for viewing the adjacent images, one of said objectives being carried by the movable lens board, and means actuated by said adjustable part for moving the last-mentioned objective transversely of its axis in accordance with focusing movement of said lens, whereby one of the images viewed by the ocular is shifted relatively to the other image.

5. In a photographic camera having a camera body and a lens carried by a lens board which is adapted to be moved to a fixed distance in front of the camera body for use, a movable part for altering the focus of the lens, a split field coincidence range finder mounted on the camera body and having a beam controlling field lens separately supported on the lens board and movable therewith, and means connected to said movable part for moving said field lens relatively to the lens board in accordance with the altered focus of the lens.

6. A photographic camera provided with an objective having a fixed back focus and an adjustable front lens element for altering its front focus, a base type range finder having a movable optical member, and means actuated by the adjustment of said element for moving the optical member in strict accordance with the adjustment of the front lens element, whereby the front focus of the objective is equal to and varies with the distance for which the range finder is set.

JOSEPH MIHALYI.